US008000252B1

(12) United States Patent
Ciena et al.

(10) Patent No.: US 8,000,252 B1
(45) Date of Patent: Aug. 16, 2011

(54) MULTI-PATH NETWORK ELEMENT MONITORING

(75) Inventors: Miguel A. Ciena, Apopka, FL (US); Gregory John Stemberger, Aldie, VA (US); Enrico Loddo, Herndon, VA (US); Howard Phillip Glidewell, Oviedo, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 115 days.

(21) Appl. No.: 12/168,364

(22) Filed: Jul. 7, 2008

(51) Int. Cl.
*G01R 31/08* (2006.01)
(52) U.S. Cl. ........ 370/244; 370/249; 370/251; 370/401; 709/224; 709/249; 709/250
(58) Field of Classification Search ................... None
See application file for complete search history.

(56) References Cited

U.S. PATENT DOCUMENTS

| | | | |
|---|---|---|---|
| 6,253,339 B1* | 6/2001 | Tse et al. | 714/47 |
| 7,336,615 B1* | 2/2008 | Pan et al. | 370/248 |
| 7,447,150 B1* | 11/2008 | Sylvain | 370/218 |
| 7,636,364 B2* | 12/2009 | Fotedar | 370/401 |
| 7,664,043 B1* | 2/2010 | D'Souza et al. | 370/242 |
| 2003/0112749 A1* | 6/2003 | Hassink et al. | 370/225 |
| 2003/0126233 A1* | 7/2003 | Bryers et al. | 709/219 |
| 2004/0165581 A1* | 8/2004 | Oogushi | 370/352 |
| 2005/0025069 A1* | 2/2005 | Aysan | 370/401 |
| 2008/0037436 A1* | 2/2008 | Liu | 370/250 |
| 2008/0080507 A1* | 4/2008 | Swallow et al. | 370/392 |

OTHER PUBLICATIONS

K. Muthukrishnan and A. Malis, "RFC2917—A Core MPLS IP VPN Architecture", Network Working Group, Sep. 2000, all pages.*
Daniel O. Awduche, et al., "Requirements for Traffic Engineering Over MPLS," Network Working Group, Sep. 1999, pp. 1-28, UUNET, Fairfax, Virginia, http://www.ietf.org/rfc/rfc2702.txt.
Daniel O. Awduche, et al., "RSVP-TE: Extensions to RSVP for LSP Tunnels," Network Working Group, Dec. 2001, pp. 1-57, Movaz Networks, Inc., McLean, Virginia; Juniper Networks, Inc., Mountain View, California; Procket Networks, Santa Clara, California; Cosine Communications, Inc., Redwood City, California; Cisco Systems, Inc., Chelmsford, Massachusetts; http://www.ietf.org/rfc/rfc3209.txt?number=3209.
Eric C. Rosen, et al., "BGP/MPLS VPNs," Network Working Group, Mar. 1999, pp. 1-24, Cisco Systems, Inc., Chelmsford, Massachusetts; Cisco Systems, Inc., San Jose, California; http://www.ietf.org/rfc/rfc2547.txt.
Eric C. Rosen, et al., "Multiprotocol Label Switching Architecture," Network Working Group, Jan. 2001, pp. 1-57, Cisco Systems, Inc., Chelmsford, Massachusetts; Force10 Networks, Inc., Milpitas, California; Juniper Networks, Inc., Sunnyvale, California; http://www.ietf.org/rfc/rfc3031.txt.
Ming Yu, et al., "A Practical Scheme for MPLS Fault Monitoring and Alarm Correlation in Backbone Networks," ScienceDirect, Computer Networks 50 (2006) 3024-3042, May 26, 2005, pp. 1-20, State University of New York, Binghamton, New York; AT&T Labs, Middletown, New Jersey.

* cited by examiner

*Primary Examiner* — Kwang B Yao
*Assistant Examiner* — Jeffrey M Rutkowski

(57) ABSTRACT

A network element is configured to function as a first virtual element and a second virtual element. A first monitoring packet is sent to the first virtual element via a label switched path. A second monitoring packet is sent to the second virtual element via an internet protocol path that includes at least a portion of the internet. A first condition of the network element is determined based on a response to the first monitoring packet. A second condition of the network element is determined based on a response to the second monitoring packet.

18 Claims, 5 Drawing Sheets

MULTI-PATH NETWORK ELEMENT MONITORING

TECHNICAL BACKGROUND

Virtual private networks (VPNs) may be used by enterprises and network communication companies to securely separate the traffic exchanged with different customers from each other. VPNs also simplify the administration of customer networks by allowing geographically diverse locations to appear to all be on a single private network. This allows the customer network administrators to link these geographically diverse locations via a third party network without regard to the third party networks other customers, or the underlying structure of the third party network.

A technology that may be used to help implement a VPN is virtual routing and forwarding (VRF). VRF allows multiple instances of a routing table to exist on a network element such as a router or switch. Because these multiple instances are independent, overlapping internet protocol addresses can be used without interfering with each other. Each of these instances may be referred to as a virtual router because they appear to other network elements to be a physical router even though they are a software construct.

OVERVIEW

A method of monitoring a network is disclosed. A network element is configured to function as a first virtual element and a second virtual element. A first monitoring packet is sent to the first virtual element via a label switched path. A second monitoring packet is sent to the second virtual element via an internet protocol path that includes at least a portion of the internet. A first condition of the network element is determined based on a response to the first monitoring packet. A second condition of the network element is determined based on a response to the second monitoring packet.

A communication system comprising a network element configured as a first virtual element and a second virtual element. The communication system includes a label switched path, a first internet interface, and a second internet interface. The communication system includes a monitor element that sends a first monitor packet to the first virtual element via the label switched path. The monitor elements sends a second monitor packet to the second virtual element via the first internet interface, a portion of the internet, and the second internet interface. The monitor element determines a first condition of the network element based on a response to the first monitor packet and a response the second monitor packet.

DETAILED DESCRIPTION

Figure 1:
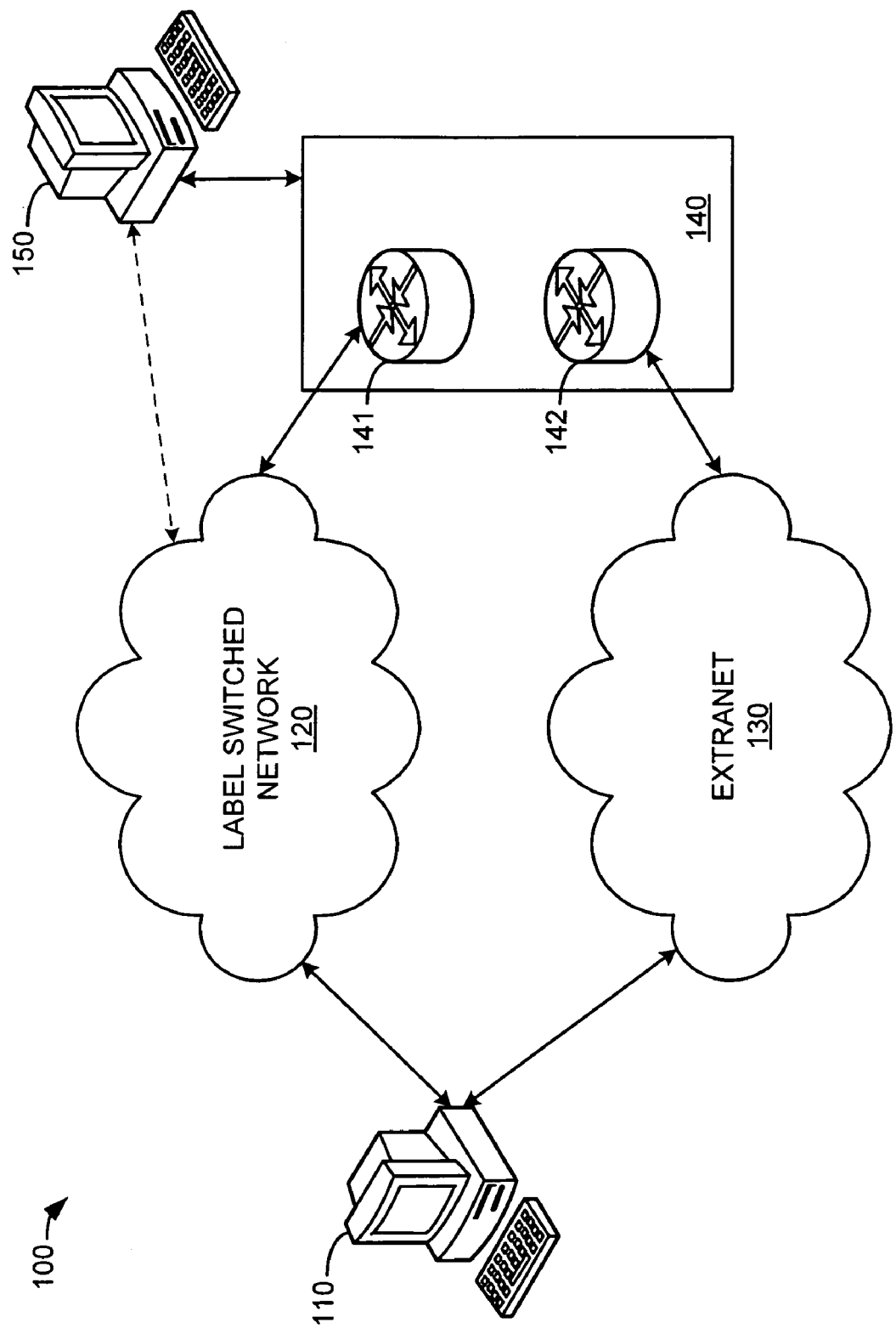
FIG. 1 is a block diagram illustrating a communication system.

FIG. 1 is a block diagram illustrating a communication system. In FIG. 1, communication system 100 comprises: monitor element 110; label switched network 120; extranet 130; network element 140; virtual router 141; virtual router 142; and computer system 150. Monitor element 110 is operatively coupled to label switched network 120. Label switched network 120 is operatively coupled to virtual router 141. Monitor element 110 is operatively coupled to extranet 130. Extranet 130 is operatively coupled to virtual router 142. Network element 140 includes virtual router 141 and virtual router 142. Thus, monitor element 110 is operatively coupled to network element 140 via label switched network 120, and also via extranet 130.

Label switched network 120 may be any network or collection of networks that: (1) couple, link, or otherwise operatively connect monitor element 110 with other devices or systems; (2) is also operatively coupled to network element 140; (3) utilizes packet switching based on packet labels to route packets within label switched network 120; and, (4) creates a VPN linking monitoring element 110 and network element 140. For example, label switched network 120 may utilize multi protocol label switching (MPLS) to route packets within label switched network 120. Other packet switched data or VPN data carrying mechanisms may also be used.

MPLS is described in a number of documents published by the Internet Engineering Task Force (IETF). These documents include: RFC-3209, RFC-2702, RFC-3031, and RFC-2547. These documents are available from the IETF at http://www.ietf.org/. Label switched network 120 may include other secondary data networks. In an example, label switched network 120 may include a backhaul network, a local network, a long distance network, a packet network, or any combination thereof, as well as other types of networks.

Extranet 130 could be any network or collection of networks that couple, link, or otherwise operatively connect monitor element 110 with other computer systems, networks, and network element 140 via a path external to label switched network 120. In addition, other secondary data networks could be used. In an example, extranet 130 may include a backhaul network, a local network, a long distance network, a packet network, the internet, or any combination thereof, as well as other types of networks. Extranet 130 may utilize internet protocol (IP).

Computer system 150 is operatively coupled to network element 140. Computer system 150 may be operatively coupled to network element 140 via label switched network 120 and virtual router 141. Thus, computer system 150 may be operatively coupled to extranet 130 via label switched network 120 and virtual router 142. This allows computer system 150 to exchange communication with devices coupled to extranet 130.

Monitor element 110 is configured to monitor and check the status of at least network element 140. Monitor element 110 may be configured to monitor and check the status of virtual router 141 and virtual router 142. To monitor network element 140, virtual router 141, or virtual router 142, monitor element 110 may send a monitor packet to virtual router 141 via label switched network 120. In response to the monitor packet, network element 140 may send a response back to monitor element 110 via label switched network 120.

For example, monitor element 110 may direct an internet control message protocol (ICMP) "echo request" packet (i.e., ICMP type 8, "ping" packet) to virtual router 141. Network element 140 may respond to this packet with an ICMP "echo reply" (i.e., ICMP type 0 packet). If monitor element 110 receives a response, it indicates a condition of network element 140. For example, a response to a ping packet directed to virtual router 141 of network element 140 may indicates that virtual router 141 is functioning properly. In addition, a response to a ping packet sent to virtual router 141 may indicate that a VPN in label switched network 120 is functioning properly.

A lack of a response to a ping packet sent to virtual router 141 may indicate that virtual router 141 is not functioning properly. A lack of a response to a ping packet sent to virtual router 141 may indicate that network element 140 is not functioning properly. Accordingly, a condition of network element 140 may be determined based on the response (or lack thereof) to a ping packet directed to virtual router 141 by monitor element 110. Examples of the condition of network element 140 that may be determined are whether virtual router 141 is functioning properly or whether network element 140 is functioning properly.

To monitor network element 140 or virtual router 142, monitor element 110 may send a monitor packet directed to virtual router 142 via extranet 130. In response to the monitor packet, network element 140 may send a response back to monitor element 110 via label switched network 120 or extranet 130.

For example, monitor element 110 may direct a ping packet to virtual router 142. Network element 140 may respond to this ping packet. If monitor element 110 receives a response, it indicates a condition of network element 140. For example, a response to a ping packet directed to virtual router 142 and network element 140 may indicate that virtual router 142 is functioning properly. In addition, a response to a ping packet sent to virtual router 142 may indicate that the interfaces between monitor element 110, label switched network 120, virtual router 142, or network element 140 and extranet 130 are functioning properly.

A lack of a response to a ping packet sent to virtual router 142 may indicate that virtual router 142 is not functioning properly. A lack of a response to a ping packet sent to virtual router 142 may indicate that network element 140 is not functioning properly. Accordingly, a condition of network element 140 may be determined based on the response (or lack thereof) to a ping packet directed to virtual router 142 by monitor element 110. Examples of the condition of network element 140 that may be determined are whether virtual router 142 is functioning properly or whether network element 140 is functioning properly.

In an embodiment, monitor element 110 may periodically direct additional packets to virtual router 141 and virtual router 142. These additional packets may be used to determine a condition of virtual router 141, virtual router 142, network element 140, label switched network 120, or extranet 130 over a period of time. For example, these additional packets may be sent once every minute to determine a condition of virtual router 141, virtual router 142, network element 140, label switched network 120, or extranet 130.

In an embodiment, the condition of network element 140 may cause an alarm condition. For example, when it is determined that network element 140 is not functioning properly, an alarm condition may be signaled. In addition, if it is determined that network element 140 is not functioning properly, monitor element 110 may suppress alarm conditions for virtual router 141 and virtual router 142. Likewise, if virtual router 141 is not functioning properly, monitor element 110 may suppress alarm conditions for virtual router 142 or network element 140.

Figure 2:
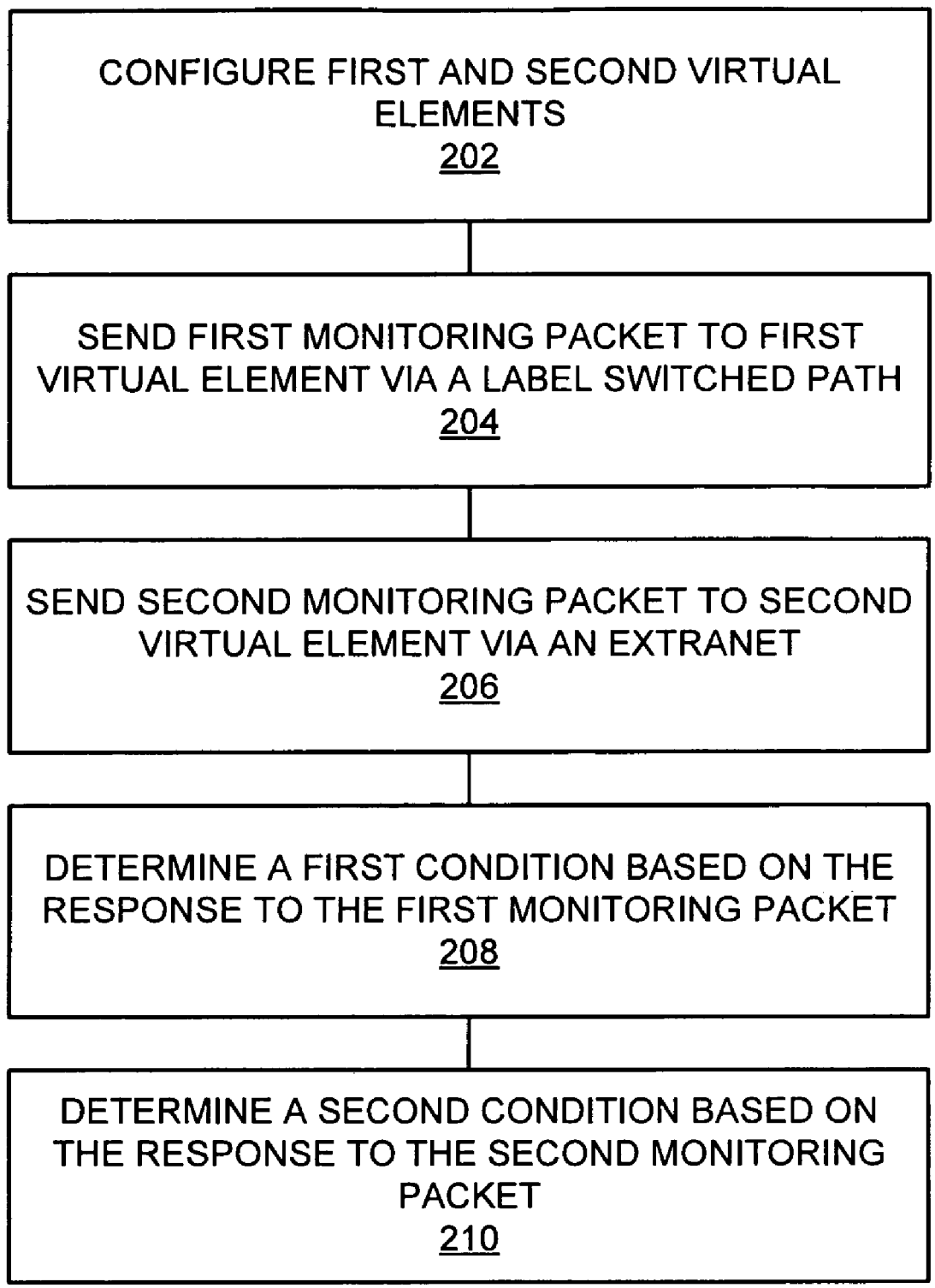
FIG. 2 is a flowchart illustrating a method of multi-path network element monitoring.

FIG. 2 is a flowchart illustrating a method of multi-path network element monitoring. The steps illustrated in FIG. 2 may be performed by communication system 100.

A first virtual element and a second virtual element are configured on a network element (202). For example, virtual router 141 and virtual router 142 may be configured on network element 140. A first monitoring packet is sent to the first virtual element via a label switched path (204). For example, monitor element 110 may send a monitoring packet, such as a ping packet, to virtual router 141 via label switched network 120. A second monitoring packet is sent to the second virtual element via an extranet (206). For example, monitor element 110 may send a monitoring packet to virtual router 142 via a path that includes extranet 130.

A first condition is determined based on the response to the first monitoring packet (208). For example, monitor element 110 may determine that the condition of virtual router 141 or network element 140 satisfies a criteria (such as "condition normal") based on a response to a monitoring packet. In another example, monitor element 110 may determine that the condition of virtual router 141 or network element 140 fails a criteria based on a lack of response to a monitoring packet.

A second condition is determined based on the response to the second monitoring packet (210). For example, monitor element 110 may determine that the condition of virtual router 142 or network element 140 satisfies a criteria based on a response to a monitoring packet. In another example, monitor element 110 may determine that the condition of virtual router 142 or network element 140 fails a criteria based on a lack of response to a monitoring packet. In another example, monitor element 110 may determine network element 140 satisfies a criteria based on the response to both the first monitoring packet and the second monitoring packet. In another example, monitor element 110 may determine a condition of network element 140 based on the lack of a response to either the first monitoring packet, or the second monitoring packet, or both.

Figure 3:
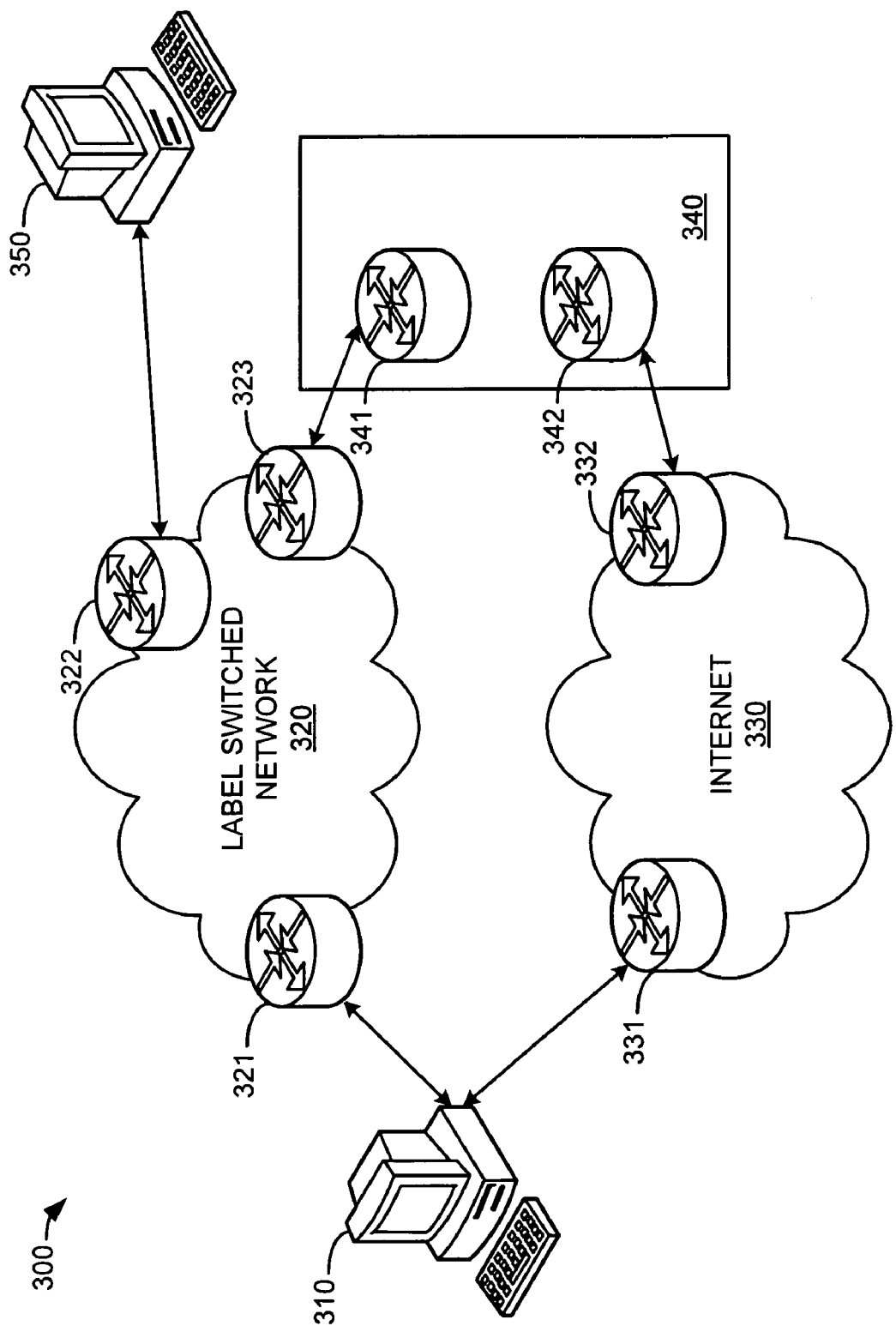
FIG. 3 is a block diagram illustrating a communication system.

FIG. 3 is a block diagram illustrating a communication system. In FIG. 3, communication system 300 comprises: monitor system 310; label switched network 320; internet 330; network element 340; and computer system 350. Label switched network 320 includes router 321, router 322, and router 323. Internet 330 includes interface router 331 and interface router 332. Network element 340 includes virtual router 341 and virtual router 342.

Monitor system 310 is operatively coupled to label switched network 320 via router 321. Label switched network 320 is operatively coupled to virtual router 341 via router 323. Monitor system 310 is operatively coupled to the internet 330 via interface router 331. The internet 330 is operatively coupled to virtual router 342 via interface router 332. Network element 340 includes virtual router 341 and virtual router 342. Thus, monitor system 310 is operatively coupled to network element 340 via label switched network 320 and via the internet 330.

Label switched network 320 may be any network or collection of networks that: (1) couple, link, or otherwise operatively connect monitor system 310 with other devices systems, or networks; (2) is also operatively coupled to network element 340; (3) utilizes packet switching based on packet labels to route packets within label switched network 320; and, (4) creates a VPN linking monitoring element 310 and network element 340. For example, label switched network 320 may utilize MPLS to route packets within label switched network 320. Other packet switched data, or VPN data carrying mechanisms may also be used.

Label switched network 320 may include other secondary data networks. In an example, label switched network 320 may include a backhaul network, a local network, a long distance network, or a packet network, or any combination thereof, as well as other types of networks.

The internet 330 can be any network or collection of networks that couple, link, or otherwise operatively connect monitor system 310 with other computer systems, networks, and network element 340 via a path external to label switched network 320. The internet typically includes links that utilize IP. In addition, other secondary data networks could be used. In an example, the internet 330 may include a backhaul network, a local network, a long distance network, a packet network, the internet, or any combination thereof, as well as other types of networks.

Computer system 350 is operatively coupled to network element 340. Computer system 350 may be operatively coupled to network element 340 via label switched network 320 and virtual router 341. Thus, computer system 350 may be operatively coupled to the internet 330 via router 322, label switched network 320, router 323, virtual router 342, and interface router 332. This allows computer system 350 to exchange communication with devices coupled to the internet 330.

Monitor system 310 is configured to monitor and check the status of at least network element 340. Monitor system 310 may be configured to monitor and check the status of virtual router 341 and virtual router 342. To monitor network element 340, virtual router 341, or virtual router 342, monitor system 310 may send a monitor packet to virtual router 341 via label switched network 320. In response to the monitor packet, network element 340 may send a response back to monitor system 310 via label switched network 320. In an embodiment, network element 340 may send a response back to monitor system 310 via the internet 330.

Monitor system 310 may direct a ping packet to virtual router 341. Network element 340 may respond to this packet with an echo reply. If monitor system 310 receives a response, it indicates a condition of network element 340. For example, a response to a ping packet directed to virtual router 341 and network element 340 may indicates that virtual router 341 is functioning properly. In addition, a response to a ping packet sent to virtual router 341 may indicate that a VPN in label switched network 320 is functioning properly.

A lack of a response to a ping packet sent to virtual router 341 may indicate that virtual router 341 is not functioning properly. A lack of a response to a ping packet sent to virtual router 341 may indicate that network element 340 is not functioning properly. Accordingly, a condition of network element 340 may be determined based on the response (or lack thereof) to a ping packet directed to virtual router 341 by monitor system 310. Examples of the condition of network element 340 that may be determined are whether virtual router 341 is functioning properly or whether network element 340 is functioning properly.

To monitor network element 340 or virtual router 342, monitor system 310 may send a monitor packet to virtual router 342 via interface router 331, the internet 330, and interface router 332. In response to the monitor packet, network element 340 may send a response back to monitor system 310 via label switched network 320 or via the internet 330.

For example, monitor system 310 may direct a ping packet to virtual router 342. Network element 340 may respond to this ping packet. If monitor system 310 receives a response, it indicates a condition of network element 340. For example, a response to a ping packet sent to directed to virtual router 342 and network element 340 may indicate that virtual router 342 is functioning properly. In addition, a response to a ping packet sent to virtual router 342 may indicate that the interfaces between the internet and monitor system 310, label switched network 320, virtual router 342, or network element 340 are functioning properly.

A lack of a response to a ping packet sent to virtual router 342 may indicate that virtual router 342 is not functioning properly. A lack of a response to a ping packet sent to virtual router 342 may indicate that network element 340 is not functioning properly. Accordingly, a condition of network element 340 may be determined based on the response (or lack thereof) to a ping packet directed to virtual router 342 by monitor system 310. Examples of the condition of network element 340 that may be determined are whether virtual router 342 is functioning properly or whether network element 340 is functioning properly.

In an embodiment, monitor system 310 may periodically direct additional packets to virtual router 341 and virtual router 342. These additional packets may be used to determine a condition of virtual router 341, virtual router 342, network element 340, label switched network 320, the internet 330, router 321, router 323, interface router 331, or interface router 332 over a period of time. For example, these additional packets may be sent once every minute to determine a condition of virtual router 341, virtual router 342, network element 340, label switched network 320, the internet 330, router 321, router 323, interface router 331, or interface router 332.

In an embodiment, the condition of network element 340 may cause an alarm condition. For example, when it is determined that network element 340 is not functioning properly, an alarm condition may be signaled. In addition, if it is determined that network element 340 is not functioning properly, monitor element 310 may suppress alarm conditions for virtual router 341 and virtual router 342. Likewise, if virtual router 341 is not functioning properly, monitor element 310 may suppress alarm conditions for virtual router 342 or network element 340.

Figure 4:
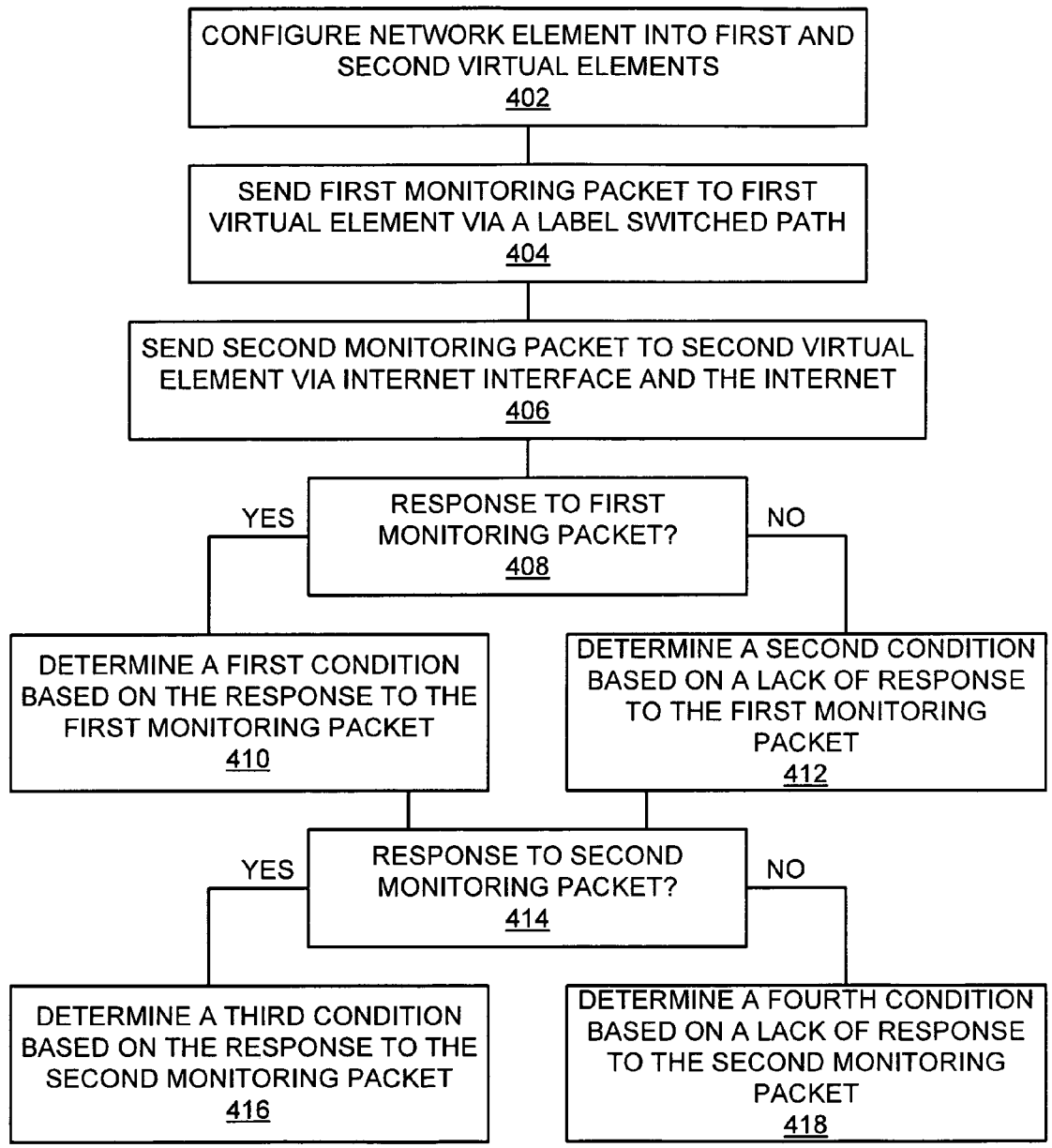
FIG. 4 is a flowchart illustrating a method of multi-path network element monitoring.

FIG. 4 is a flowchart illustrating a method of multi-path network element monitoring. The steps illustrated in FIG. 4 may be performed by communication system 100 or communication system 300.

A network element is configured into a first virtual element and a second virtual element (402). For example, network element 340 may be configured to include virtual router 341 and virtual router 342. A first monitoring packet is sent to the first virtual element via a label switched path (404). For example, monitor system 310 may send a monitoring packet, such as a ping packet, to virtual router 341 via router 321, label switched network 320, and router 323. A second monitoring packet is sent to the second virtual element via an internet interface and the internet (406). For example, monitor system 310 may send a monitoring packet to virtual router 342 via a path that includes interface router 331, the internet 330, and interface router 332.

If there is a response to the first monitoring packet, flow proceeds to block 410 then block 414. Otherwise, flow proceeds to block 412 then block 414 (408). A first condition is determined based on the response to the first monitoring packet (410). For example, monitor system 310 may determine that the condition of virtual router 341 or network element 340 satisfies a criteria (such as "virtual router 341 is OK") based on a response to the first monitoring packet. In another example, monitor system 310 may determine that the condition of virtual router 341 or network element 340 fails a criteria based on the response to the first monitoring packet.

A second condition is determined based on the lack of a response to the first monitoring packet (412). For example, monitoring system 310 may determine that the condition of virtual router 341 or network element 340 satisfies a criteria (such as "virtual router 341 is not OK") based on a lack of a response to the first monitoring packet.

If there is a response to the second monitoring packet, flow proceeds to block 416. Otherwise, flow proceeds to block 418 (414). A third condition is determined based on the response to the second monitoring packet (416). For example, monitor system 310 may determine that the condition of virtual router 342 and network element 340 satisfies a criteria (such as "virtual router 342 is OK") based on a response to the second monitoring packet. In another example, monitor system 310 may determine that the condition of virtual router 341 or network element 340 fails a criteria based on the response to the first monitoring packet.

A fourth condition is determined based on the lack of a response to the second monitoring packet (418). For example, monitoring system 310 may determine that the condition of virtual router 342 or network element 340 satisfies a criteria (such as "network element 340 is not OK") based on a lack of a response to the second monitoring packet.

In an embodiment, the determining of a condition may cause the suppression of other conditions. For example, if there was no response to the first packet, and there was no response to the second packet, the second condition (e.g., "virtual router 341 is not OK") may be suppressed in favor of a different condition (e.g., "network element 340 is not OK"). In an embodiment, this suppression may reduce the number of alarms or alarm conditions generated when network element 340 fails by eliminating alarms or alarm conditions for virtual routers 341 and 342.

The methods, systems, networks, routers, and elements described above may be implemented with, contain, or be executed by one or more computer systems. The methods described above may also be stored on a computer readable medium. Many of the elements of communication system 100 and communication system 300 may be, comprise, or include computers systems. This includes, but is not limited to: monitor element 110; label switched network 120; extranet 130; network element 140; computer system 150; monitor system 310; label switched network 320; internet 330; network element 340; computer system 350; router 321; router 322; router 323; interface router 331; and interface router 332.

Figure 5:
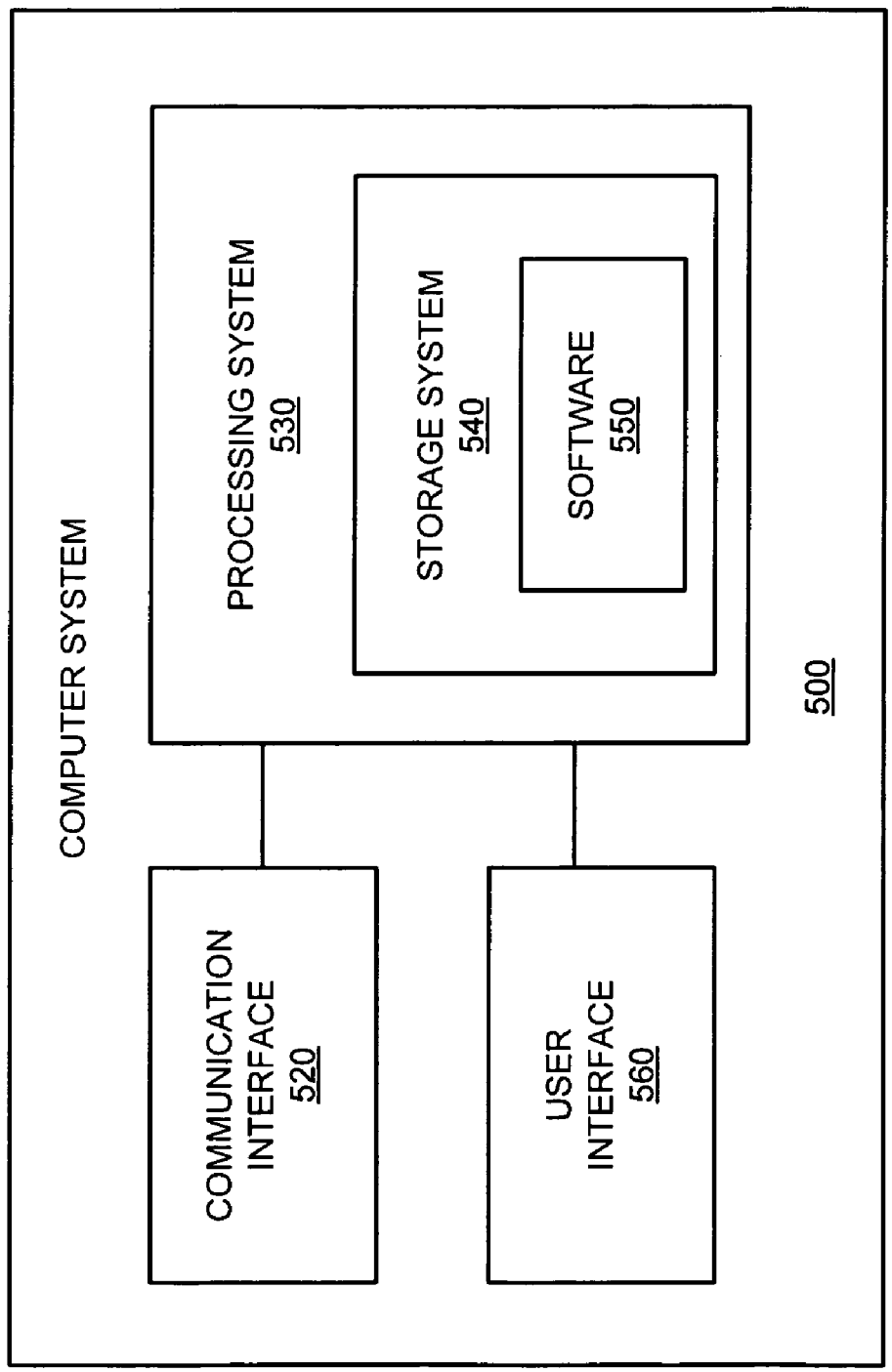
FIG. 5 is a block diagram of a computer system.

FIG. 5 illustrates a block diagram of a computer system. Computer system 500 includes communication interface 520, processing system 530, and user interface 560. Processing system 530 includes storage system 540. Storage system 540 stores software 550. Processing system 530 is linked to communication interface 520 and user interface 560. Computer system 500 could be comprised of a programmed general-purpose computer, although those skilled in the art will appreciate that programmable or special purpose circuitry and equipment may be used. Computer system 500 may be distributed among multiple devices that together comprise elements 520-560.

Communication interface 520 could comprise a network interface, modem, port, transceiver, or some other communication device. Communication interface 520 may be distributed among multiple communication devices. Processing system 530 could comprise a computer microprocessor, logic circuit, or some other processing device. Processing system 530 may be distributed among multiple processing devices. User interface 560 could comprise a keyboard, mouse, voice recognition interface, microphone and speakers, graphical display, touch screen, or some other type of user device. User interface 560 may be distributed among multiple user devices. Storage system 540 could comprise a disk, tape, integrated circuit, server, or some other memory device. Storage system 540 may be distributed among multiple memory devices.

Processing system 530 retrieves and executes software 550 from storage system 540. Software 550 may comprise an operating system, utilities, drivers, networking software, and other software typically loaded onto a computer system. Software 550 could comprise an application program, firmware, or some other form of machine-readable processing instructions. When executed by processing system 530, software 550 directs processing system 530 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of monitoring a network, comprising:
   in a network monitor element performing the following steps:
   sending a first monitoring packet to a first virtual element via a first label switched path, wherein a network element is configured to function as the first virtual element and a second virtual element;
   sending a second monitoring packet to the second virtual element via an internet protocol path, wherein the internet protocol path includes a first internet interface, at least a portion of the internet, and a second internet interface;
   receiving a first response to the first monitoring packet via a second label switched path;
   determining a first condition of the first virtual element based on the first response to the first monitoring packet;
   determining a second condition of the second virtual element based on a second response to the second monitoring packet; and
   determining a condition of the network element based on the first condition and the second condition.

2. The method of claim 1, further comprising:
   in the network monitor element:
   sending a third monitoring packet to the first virtual element via the first label switched path; and,
   determining a third condition of the first virtual element based on a lack of a response to the third monitoring packet.

3. The method of claim 2, further comprising:
   in the network monitor element:
   sending a fourth monitoring packet to the second virtual element via the internet protocol path;
   determining a fourth condition of the second virtual element based on a lack of a response to the fourth monitoring packet; and
   suppressing a signaling of the fourth condition based on the third condition.

4. The method of claim 1, further comprising:
   in the network monitor element:
   sending a third monitoring packet to the second virtual element via the internet protocol path; and,
   determining a third condition of the second virtual element based on a lack of a response to the third monitoring packet.

5. The method of claim 4, further comprising:
in the network monitor element:
sending a fourth monitoring packet to the first virtual element via the first label switched path;
determining a fourth condition of the first virtual element based on a lack of a response to the fourth monitoring packet; and
suppressing the signaling of the fourth condition based on the third condition.

6. The method of claim 1, further comprising:
in the network monitor element, receiving the second response via the second label switched path.

7. The method of claim 1, further comprising:
in the network monitor element, receiving the second response via the internet protocol path.

8. A communication system, comprising:
a first network element configured as a first virtual element and a second virtual element;
a first label switched path between a monitor element and the first network element;
a first internet interface coupled to the monitor element;
a second internet interface coupled to the first network element;
the monitor element configured to send a first monitoring packet to the first virtual element via the first label switched path and a second monitoring packet to the second virtual element via the first internet interface, a portion of the internet, and the second internet interface; and
the monitor element further configured to receive a first response to the first monitoring packet via a second label switched path, determine a first condition of the first virtual element based on the first response to the first monitoring packet, determine a second condition of the second virtual element based on a second response to the second monitoring packet, and determine a condition of the network element based on the first condition and the second condition.

9. The communication system of claim 8, wherein the monitoring element is further configured to send a third monitoring packet to the first virtual element via the first label switched path and determine a third condition of the first virtual element based on a lack of response to the third monitoring packet.

10. The communication system of claim 9, wherein the monitoring element is further configured to:
send a fourth monitoring packet to the second virtual element via the first internet interface and the second internet interface;
determine a fourth condition for the second virtual element based on a lack of response to the fourth monitoring packet; and
signal the fourth condition for the network element based on the second condition and the third condition.

11. The communication system of claim 8, wherein the monitoring element is further configured to send a third monitoring packet to the second virtual element via the first internet interface and the second internet interface, and determine a third condition of the network element based on a lack of response to the third monitoring packet.

12. The communication system of claim 11, wherein the monitoring element is further configured to:
send a fourth monitoring packet to the second virtual element via the first label switched path;
determine a fourth condition for the first virtual element based on a lack of response to the fourth monitoring packet; and,
signal the fourth condition for the network element based on the second condition and the third condition.

13. The communication system of claim 8, wherein the monitoring element is further configured to receive the second response via the second label switched path.

14. The communication system of claim 8, wherein the monitoring element is further configured to receive the second response via a path that includes the first internet interface.

15. A program storage device readable by a machine, tangibly embodying a program of instructions executable by the machine to perform method steps to operate a communication system, the method comprising:
configuring a network element to function as a first virtual element and a second virtual element;
in a network monitor element performing the following steps:
sending a first monitoring packet to the first virtual element via a first label switched path;
sending a second monitoring packet to the second virtual element via an internet protocol path, wherein the internet protocol path includes a first internet interface, at least a portion of the internet, and a second internet interface;
receiving a first response to the first monitoring packet via a second label switched path;
determining a first condition of the first virtual element based on the first response to the first monitoring packet;
determining a second condition of the second virtual element based on a second response to the second monitoring packet; and
determining a condition of the network element based on the first condition and the second condition.

16. The program storage device of claim 15, wherein the method further comprises:
sending a third monitoring packet to the first virtual element via the first label switched path; and,
determining a third condition of the first virtual element based on a lack of a response to the third monitoring packet.

17. The program storage device of claim 15, wherein the method further comprises:
sending a third monitoring packet to the second virtual element via the internet protocol path; and,
determining a third condition of the second virtual element based on a lack of a response to the third monitoring packet.

18. The program storage device of claim 15, wherein the method further comprises:
receiving the second response via the second label switched path.

* * * * *